US012554002B2

(12) United States Patent
Yan et al.

(10) Patent No.: US 12,554,002 B2
(45) Date of Patent: Feb. 17, 2026

(54) METHOD FOR SOLVING RADAR AMBIGUITY AND OCCLUSION BASED ON ORTHOGONAL TWO-PHASE CODED SIGNAL

(71) Applicant: YANGTZE DELTA REGION INSTITUTE (QUZHOU), UNIVERSITY OF ELECTRONIC SCIENCE AND TECHNOLOGY OF CHINA, Zhejiang (CN)

(72) Inventors: Jihong Yan, Zhejiang (CN); Cong Li, Zhejiang (CN); Huan Zhang, Zhejiang (CN); Haiyang Dong, Zhejiang (CN); Jianshu Zhai, Zhejiang (CN); Li Yang, Zhejiang (CN); Weihan Ni, Zhejiang (CN); Shunxiang Wang, Zhejiang (CN)

(73) Assignee: YANGTZE DELTA REGION INSTITUTE (QUZHOU), UNIVERSITY OF ELECTRONIC SCIENCE AND TECHNOLOGY OF CHINA, Quzhou (CN)

( * ) Notice: Subject to any disclaimer, the term of this patent is extended or adjusted under 35 U.S.C. 154(b) by 261 days.

(21) Appl. No.: 18/284,245

(22) PCT Filed: Sep. 15, 2022

(86) PCT No.: PCT/CN2022/118911
§ 371 (c)(1),
(2) Date: Sep. 26, 2023

(87) PCT Pub. No.: WO2023/040929
PCT Pub. Date: Mar. 23, 2023

(65) Prior Publication Data
US 2024/0176005 A1 May 30, 2024

(30) Foreign Application Priority Data
Sep. 15, 2021 (CN) .......................... 202111082944.4

(51) Int. Cl.
*G01S 13/32* (2006.01)
*G01S 7/292* (2006.01)
(Continued)

(52) U.S. Cl.
CPC .......... *G01S 13/325* (2013.01); *G01S 7/2923* (2013.01); *G01S 13/582* (2013.01); *G06N 3/126* (2013.01)

(58) Field of Classification Search
CPC .... G01S 13/325; G01S 7/2923; G01S 13/582; G06N 3/126
See application file for complete search history.

(56) References Cited

U.S. PATENT DOCUMENTS

| 7,081,848 B1 * | 7/2006 | Adams ................. | G01S 7/2923 342/134 |
| 2013/0278455 A1 * | 10/2013 | Song .................... | G01S 13/288 342/137 |

(Continued)

*Primary Examiner* — William Kelleher
*Assistant Examiner* — Hailey R Le
(74) *Attorney, Agent, or Firm* — Nitin Kaushik

(57) ABSTRACT

Provided is a method for solving radar ambiguity and occlusion based on an orthogonal two-phase coded signal. The method includes: generating and optimizing an orthogonal two-phase coded signal set by means of a walsh matrix and a genetic algorithm, and alternatively, obtaining an orthogonal two-phase coded signal set through an exhaustive method, depending on a chip length; determining the radar period and the number m of transmission pulses in a period according to the radar farthest detection range and the pulse repetition interval (PRI), and selecting m signals from the orthogonal two-phase coded signal set, to constitute a group of orthogonal two-phase coded pulse signals; and accumulating echoes of transmitted pulse signals, to generate an echo matrix, performing frequency domain pulse compression, to obtain a processed new matrix, and performing moving target detection on the matrix.

8 Claims, 4 Drawing Sheets

(51) Int. Cl.
  *G01S 13/58* (2006.01)
  *G06N 3/126* (2023.01)

(56) References Cited

U.S. PATENT DOCUMENTS

2020/0049812 A1* 2/2020 Jansen .................. G01S 13/343
2020/0363523 A1* 11/2020 Nicolls ................. G01S 13/288
2021/0231787 A1* 7/2021 Salazar Aquino ...... G01S 13/28

* cited by examiner

METHOD FOR SOLVING RADAR AMBIGUITY AND OCCLUSION BASED ON ORTHOGONAL TWO-PHASE CODED SIGNAL

CROSS REFERENCE TO RELATED APPLICATION

The present application is a national stage application of International Patent Application No. PCT/CN2022/118911, filed on Sep. 15, 2022, which claims priority to the Chinese Patent Application No. 202111082944.4, filed with the China National Intellectual Property Administration (CNIPA) on Sep. 15, 2021, and entitled "METHOD FOR SOLVING RADAR AMBIGUITY AND OCCLUSION BASED ON ORTHOGONAL TWO-PHASE CODED SIGNAL", the disclosure of which is incorporated by reference herein in its entirety as part of the present application.

TECHNICAL FIELD

The present disclosure relates to the field of radars, and in particular to a method for solving radar ambiguity and occlusion based on an orthogonal two-phase coded signal.

BACKGROUND

In a search phase of a digital array radar, a target range, velocity, angle, etc. are unknown. In order to detect a target at a longer range, a pulse Doppler (PD) radar system with a shared antenna (or a non-shared antenna) for transceiving is typically used (this patent aims at the scene of the shared antenna), a transmitting state and a receiving state are switchable, and transmitting leakage has no impact on the reception of target echoes by the radar.

Range ambiguity of a radar with a pulse transceiving switching system will be produced when a delay time of a target is greater than a repetition period of a transmission pulse. Velocity ambiguity will be produced when a Doppler frequency caused by the motion of the target is greater than half a repetition frequency of the transmission pulse.

To solve the velocity ambiguity, a high pulse repetition frequency (HPRF) working mode will be practicable, which leads to the range ambiguity and range occlusion at the same time. To solve the range ambiguity, several different pulse repetition intervals (PRIs) are traditionally used. The PRI is usually selected based on a remainder theorem, a one-dimensional set algorithm, a look-up table, etc., but all of which are far from flawless.

Two-phase coded signals, common pulse-voltage radar signals, have been widely studied and used for non-hyper-velocity targets due to their excellent noise-like and low intercept probability features, although they are Doppler sensitive.

SUMMARY

The technical problems to be solved by the present disclosure are range ambiguity and occlusion. The present disclosure provides a method for solving radar ambiguity and occlusion based on an orthogonal two-phase coded signal to solve the above problems.

The method used in the present disclosure is to narrow down a working blind area of a two-phase coded pulse radar and to minimize a width of a transmission pulse, that is, a chip length of a two-phase code. In order to solve the problem of velocity ambiguity, a high pulse repetition frequency (HPRF) working mode is used, and the problem of range ambiguity may be solved through a receiving signal processing method described later in the present disclosure. In order to solve the problem of range occlusion, the transmission pulse in the present disclosure has two different high pulse repetition frequencies.

The present disclosure is implemented by the following technical solution:

A method for solving radar ambiguity and occlusion based on an orthogonal two-phase coded signal includes:

step 1, determining a maximum code length of two-phase coded signals corresponding to time widths of transmission pulses according to a range blind area and a range resolution of a radar system, and selecting a closest $2^N$ (N is an integer) which is less than the maximum code length as a chip length of a single pulse;

step 2, in order to obtain the orthogonal two-phase coded signals with desirable auto-correlation and cross-correlation properties, generating and optimizing an orthogonal two-phase coded signal set by means of a walsh matrix and a genetic algorithm, and alternatively, obtaining an orthogonal two-phase coded signal set through an exhaustive method, depending on a code length;

step 3, determining a pulse time width according to the blind area, and determining a pulse repetition frequency (PRF) according to a highest radial velocity of a target;

step 4, determining a radar period according to a radar farthest detection range, determining a number m of the transmission pulses in a time corresponding to a farthest detection range according to a pulse repetition interval (PRI) obtained in step 3, and selecting m signals from the orthogonal two-phase coded signal set generated in step 2, to constitute a group of orthogonal two-phase coded pulse signals;

step 5, and accumulating echoes of transmitted pulse signals, to generate an echo matrix, performing frequency domain pulse compression, to obtain a processed new matrix, and performing moving target detection (MTD) on the matrix.

Further, in step 2, in response to a longer chip, the walsh matrix and the genetic algorithm are used for generation and optimization, and with a criterion of minimizing an auto-correlation sidelobe and minimizing a cross-correlation peak, the orthogonal two-phase coded signal set is obtained; and in response to a shorter chip, a better auto-correlation sidelobe and a better cross-correlation peak are selected to form the orthogonal two-phase coded signal set through the exhaustive method.

Further, in step 2, the orthogonal two-phase coded signal set is generated based on the walsh matrix and by means of the genetic algorithm specifically according to the following steps:

constructing a fitness function value of the genetic algorithm as follows:

$$E = \omega_1 \sum_{l=1}^{M} \max_{k \neq 0} |A(\phi_l, k)| + \omega_2 \sum_{p=1}^{M-1} \sum_{q=p+1}^{M} \max_{k} |C(\phi_p, \phi_q, k)|$$

where $A(\phi_l, k)$ is an auto-correlation function, with an expression as follows:

$$A(\phi_l, k) = \begin{cases} \dfrac{1}{N}\sum_{n=1}^{N-k} \exp(j(\phi_l(n) - \phi_l(n+k))), & 0 \le k < N \\ \dfrac{1}{N}\sum_{n=-k+1}^{N} \exp(j(\phi_l(n) - \phi_l(n+k))), & -N < k < 0 \end{cases}$$

$(\phi_l(n) = 0, \pi)$ $C(\phi_p, \phi_q, k)$ is a cross-correlation function, with an expression as follows:

$$C(\phi_p, \phi_q, k) = \begin{cases} \dfrac{1}{N}\sum_{n=1}^{N-k} \exp(j(\phi_q(n) - \phi_p(n+k))), & 0 \le k < N \\ \dfrac{1}{N}\sum_{n=-k+1}^{N} \exp(j(\phi_q(n) - \phi_p(n+k))), & -N < k < 0 \end{cases}$$

$(p \ne q; \phi_p(n) = 0, \pi; \phi_q(n) = 0, \pi)$ in a fitness function, $\omega_1$ and $\omega_2$ are weighted coefficients of the fitness function and satisfy $\omega_1 + \omega_2 = 1$;

generating the walsh matrix having a size of N×N, performing random column exchange, and selecting M waveforms (M is a number of required orthogonal signals) with a criterion of minimizing the fitness function value (that is, minimizing the auto-correlation sidelobe and the cross-correlation peak), where an optimized M×N matrix serves as an input matrix of the genetic algorithm;

where an iterative process of the genetic algorithm includes:

a. computing the fitness function value of the matrix, determining whether the fitness function value satisfies an end condition, in response to determining that the fitness function value satisfies the end condition, ending iteration, and otherwise, performing next selection, crossover and mutation, and computing the fitness function value until the end condition is satisfied;

b. discarding a row with a largest fitness function value, and selecting remaining rows with smaller fitness function values in a population for subsequent crossover and mutation;

c. pairing rows in the population randomly, and performing random cross-over on two-phase code values of paired rows, to recombine the paired rows into new rows;

d. mutating code values of some columns in the population randomly according to a mutation probability, that is, mutating the code values from 1 to −1, or from −1 to 1;

e. and replacing a row with the largest fitness function value in an initial population with a row with the smallest fitness function value in a new population, and returning to step a to compute the fitness function value;

where the end condition is that a number of iterations reaches an upper limit, or the genetic algorithm ends when a difference between optimal fitness of two adjacent generations in successive multiple generations is less than a threshold;

and an output matrix of the genetic algorithm is the orthogonal two-phase coded signal set.

Further, the method for solving radar ambiguity and occlusion based on an orthogonal two-phase coded signal further includes determining a lowest transmission pulse repetition frequency (PRF) of the radar according to a maximum radial velocity of the target, so as to guarantee that no velocity ambiguity caused, and a transmission pulse repetition frequency (PRF) in a high repetition frequency mode is used.

Further, a radar period is determined according to the radar farthest detection range, the number m of the transmission pulses is determined according to the pulse repetition interval (PRI) and a reciprocal of the transmission pulse repetition frequency (PRF), PRI is a time interval between two adjacent transmission pulses, and an expression is as follows:

$$m = \frac{T_{max}}{PRI}$$

The orthogonal two-phase coded pulse signals are obtained in combination with the orthogonal two-phase coded signal set described in step 2.

Further, the method for solving radar ambiguity and occlusion based on an orthogonal two-phase coded signal further includes doing accumulation in the radar system, and repeatedly transmitting the orthogonal two-phase coded pulse signals $a_1, a_2, \ldots, a_m$ for a plurality of times in one radar period CPI, where the number of $T_{max}$ included in one radar period CPI is adaptively selected according to the radar system.

Further, pulse compression is performed on an echo and the closest transmitting pulse in a conventional radar signal method, which usually causes range ambiguity due to a same transmitting pulse. The radar system in the present disclosure uses a transceiving switching mode. Specifically, a receiver collects echoes in a $T_{max}$ and down-converts the echoes to a digital baseband signal in advance, and then sets the transmitting pulses in a $T_{max}$ to zeros. A time sequence is reconstructed and includes m zeros with a same width as the transmission pulses and m echoes in a $T_{max}$.

Further, the frequency domain pulse compression and MTD of the echo matrix specifically include:

constructing the echo matrix R, where the time length of the first row is $T_{max}$ (that is, a time length taking a time when the signal $a_1$ starts to be transmitted as a start), the time length of the second row is also $T_{max}$ (that is, the time length taking the time when the signal $a_2$ starts to be transmitted as the start), and so on for subsequent rows, and processing a subsequent echo in one CPI according to the fact that the plurality of $T_{max}$ are included in the radar period CPI, to obtain the echo matrix R as follows:

$$R = \begin{bmatrix} R_1 \\ R_2 \\ \vdots \\ R_m \\ \vdots \end{bmatrix} = \begin{bmatrix} 0_{a1}, r_{a1}, 0_{a2}, r_{a2}, \ldots, 0_{am}, r_{am} \\ 0_{a2}, r_{a2}, 0_{a3}, r_{a3}, \ldots, 0_{a1}, r'_{a1} \\ \vdots \\ 0_{am}, r_{am}, 0_{a1}, r'_{a1}, \ldots, 0_{a(m-1)}, r'_{a(m-1)} \\ \vdots \end{bmatrix}$$

performing frequency domain pulse compression on an echo $R_1$ of the first row of the echo matrix R and $A_1$, where $A_1$ is set as 0 after the transmitted orthogonal two-phase coded pulse signal $a_1$, such that $A_1$ and $R_1$ are time sequences having an equal length, the frequency domain pulse compression is used in a processing mode as follows, and CONJ is a conjugate operation:

$X_1 = \text{IFFT}(\text{FFT}(R_1) \cdot \text{CONJ}(\text{FFT}(A_1)))$ performing frequency domain pulse compression on an echo $R_2$ of the second row of the matrix R and $A_2$, where $A_2$ is set as 0 after the transmitted orthogonal two-phase coded pulse signal $a_2$, such that $A_2$ and $R_2$ are time sequences having an equal length;

performing the same processing on the remaining rows of the matrix R, and placing processed data into corresponding rows of a new matrix X;

and performing fast Fourier transform (FFT), that is, MTD on each column of the processed new matrix X, where a peak value in the matrix represents a range and velocity of the target.

In a traditional pulse Doppler (PD) radar, echoes of different pulses from targets at different ranges may overlap, and a peak of a traditional MTD method is range-ambiguous, which is not enough to distinguish different targets from the overlapping echoes. After the above processing, even if the echoes are the plurality of overlapping target echoes, the peak in an MTD result may reflect that the different targets are located at different ranges, thus solving the range ambiguity of echo overlapping.

The radar uses the transceiving switching mode, which will inevitably cause the range occlusion. In order to avoid range occlusion caused by transceiving switching, in some radar periods, another pulse repetition frequency may be used for a transmission signal. The repetition frequency is slightly greater than a minimum pulse repetition frequency. In this case, orthogonal two-phase coded pulse signals $b_1$, $b_2$, ..., $b_n$ are orthogonal in pairs and have desirable auto-correlation and cross-correlation properties, and n is slightly greater than m. The range occlusion may be solved by means of transmission at two different pulse repetition frequencies and then processing of the radar signals.

The present disclosure has the following advantages and beneficial effects:
the problem of velocity ambiguity is well solved while the problems of range ambiguity and occlusion are solved.

BRIEF DESCRIPTION OF THE DRAWINGS

The drawings described herein are provided for further understanding on the embodiments of the present disclosure, and constitute a part of the present application rather than a limit to the embodiments of the present disclosure. In the drawings.

DETAILED DESCRIPTION OF THE EMBODIMENTS

Figure 1:
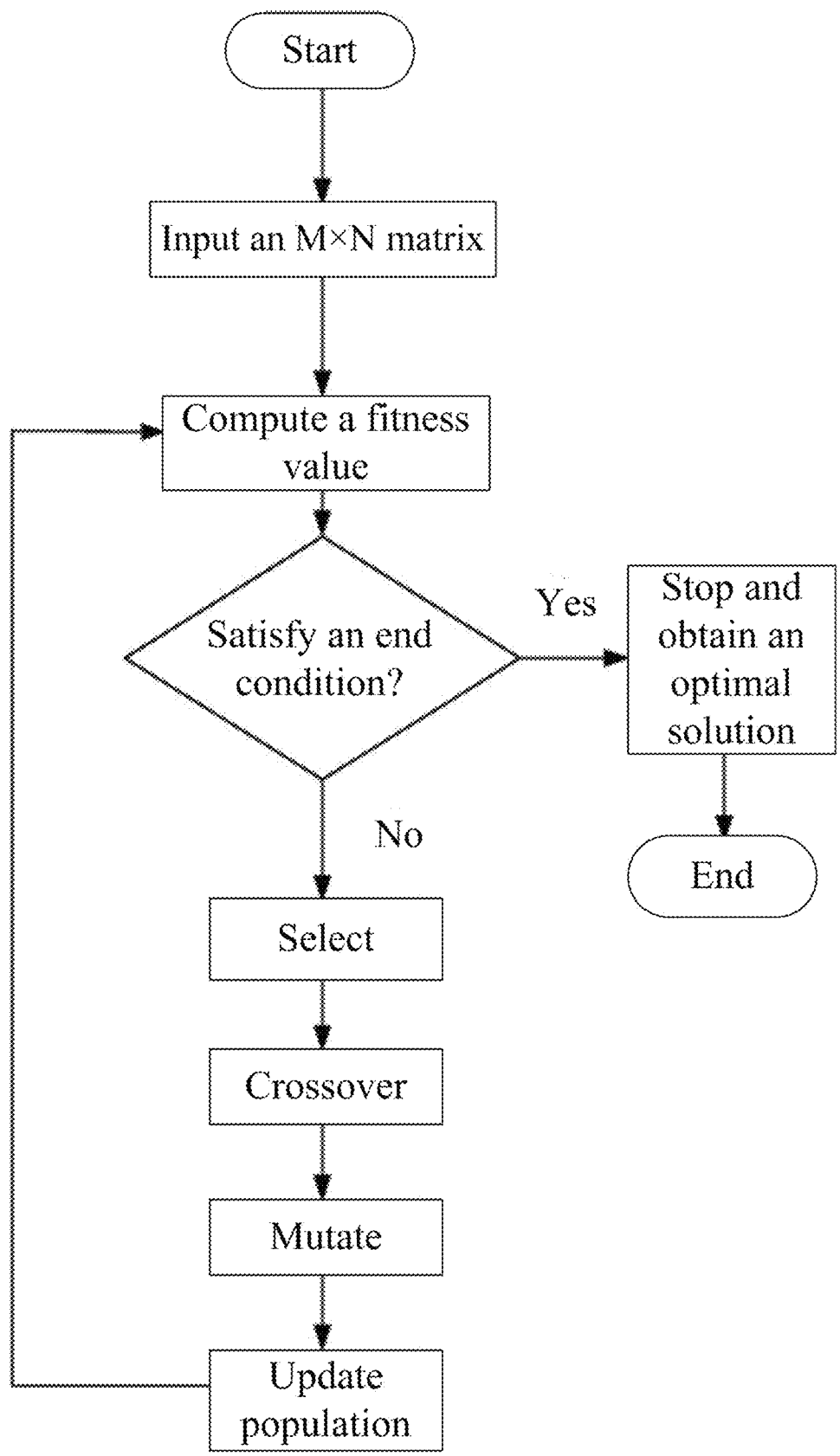
FIG. 1 is a flowchart of generation of an orthogonal two-phase coded signal according to the present disclosure.

Hereinafter, the terms "include" or "may include", which may be used in the various embodiments of the present disclosure, indicate the presence of disclosed functions, operations, or elements, and do not limit the addition of one or more functions, operations, or elements. In addition, the terms "include", "have" and their cognate words, which can be used in the various examples of the present disclosure, are merely intended to indicate specific features, numbers, steps, operations, elements, components, or combinations thereof, and should not be understood as first precluding the existence of one or more other features, numbers, steps, operations, elements, components, or combinations thereof, or the possibility of adding one or more features, numbers, steps, operations, elements, components, or combinations thereof.

In various embodiments of the present disclosure, the expression "or" or "at least one of A or/and B" includes any and all combinations of the words listed simultaneously. For example, the expression "A or B" or "at least one of A or/and B" may include A, may include B or may include both A and B.

Expressions (such as "first" and "second") used in the various examples of the present disclosure may modify various constituent elements in the various examples, but may not limit corresponding constituent elements. For example, the above descriptions do not limit an order and/or importance of the elements. The above expressions are merely used for distinguishing one element from the other elements. For example, a first user device and a second user device indicate different user devices, although both are user devices. For example, without departing from a range of the various examples of the present disclosure, a first element may be referred to as a second element; and similarly, a second element may be referred to as a first element.

It is to be noted that if one constituent element is described as being "connected" to another constituent element, the first constituent element can be directly connected to the second constituent element, and a third constituent element can be "connected" between the first constituent element and the second constituent element. Conversely, when a constituent element is "directly connected" to another constituent element, it can be understood that no third constituent element is present between the first constituent element and the second constituent element.

The terms used in the various examples of the present disclosure are merely intended to describe specific examples rather than to limit the various examples of the present disclosure. As used herein, a singular form is intended to include a plural form as well, unless the context clearly indicates otherwise. Unless otherwise defined, all terms (including technical terms and scientific terms) used herein have the same meaning as those commonly understood by those of ordinary skill in the art to which the examples of the present disclosure belong. The terms (such as those defined in commonly used dictionaries) will be interpreted as having the same meaning as the contextual meaning in the related technical field, and will not be interpreted as having idealized or overly formal meanings, unless clearly defined in the examples of the present disclosure.

In order to make the objectives, technical solutions and advantages of the present disclosure more apparent, the present disclosure will be further described in detail below with reference to the embodiments and drawing. The exemplary implementation modes and descriptions thereof in the present disclosure are only used to explain the present disclosure, rather than to limit the present disclosure.

A method for solving radar ambiguity and occlusion based on an orthogonal two-phase coded signal includes:
step 1, a maximum code length of two-phase coded signals corresponding to time width of transmission pulses is determined according to a range blind area and a range resolution of a radar system, and a closest $2^N$ (N is an integer) which is less than the maximum code length is selected as a chip length of a single pulse.

Step 2, in order to obtain the orthogonal two-phase coded signals with desirable auto-correlation and cross-correlation properties, an orthogonal two-phase coded signal set is generated and optimized by means of a walsh matrix and a genetic algorithm, and alternatively, an orthogonal two-phase coded signal set is obtained through an exhaustive method, depending on the chip length. In response to a longer chip, the walsh matrix and the genetic algorithm are used for generation and optimization, and with a criterion of minimizing an auto-correlation sidelobe and minimizing a cross-correlation peak, the orthogonal two-phase coded signal set is obtained. in response to a shorter chip, a better auto-correlation sidelobe and a better cross-correlation peak are selected to form the orthogonal two-phase coded signal set through the exhaustive method.

The orthogonal two-phase coded signal set is generated based on the walsh matrix and by means of the genetic algorithm specifically according to the following steps:

a fitness function value of the genetic algorithm is constructed as follows:

$$E = \omega_1 \sum_{l=1}^{M} \max_{k \neq 0} |A(\phi_l, k)| + \omega_2 \sum_{p=1}^{M-1} \sum_{q=p+1}^{M} \max_{k} |C(\phi_p, \phi_q, k)|$$

where $A(\phi_l, k)$ is an auto-correlation function, with an expression as follows:

$$A(\phi_l, k) = \begin{cases} \dfrac{1}{N} \sum_{n=1}^{N-k} \exp(j(\phi_l(n) - \phi_l(n+k))), & 0 \leq k < N \\ \dfrac{1}{N} \sum_{n=-k+1}^{N} \exp(j(\phi_l(n) - \phi_l(n+k))), & -N < k < 0 \end{cases}$$

$(\phi_l(n) = 0, \pi)$ $C(\phi_p, \phi_q, k)$ is a cross-correlation function, with an expression as follows:

$$C(\phi_p, \phi_q, k) = \begin{cases} \dfrac{1}{N} \sum_{n=1}^{N-k} \exp(j(\phi_q(n) - \phi_p(n+k))), & 0 \leq k < N \\ \dfrac{1}{N} \sum_{n=-k+1}^{N} \exp(j(\phi_q(n) - \phi_p(n+k))), & -N < k < 0 \end{cases}$$

$(p \neq q; \phi_p(n) = 0, \pi; \phi_q(n) = 0, \pi)$

In a fitness function, $\omega_1$ and $\omega_2$ are weighted coefficients of the fitness function and satisfy $\omega_1 + \omega_2 = 1$.

The walsh matrix having a size of N×N is generated, random column exchange is performed, and M waveforms (M is a number of required orthogonal signals) are selected with a criterion of minimizing the fitness function value (that is, minimizing the auto-correlation sidelobe and the cross-correlation peak). An optimized M×N matrix serves as an input matrix of the genetic algorithm.

A flowchart of the genetic algorithm is shown in FIG. 1. An iterative process of the genetic algorithm includes:

a. the fitness function value of the matrix is computed, whether the fitness function value satisfies an end condition is determined, in response to determining that the fitness function value satisfies the end condition, iteration ends, and otherwise, next selection, crossover and mutation are performed, and the fitness function value is computed until the end condition is satisfied.

b. a row with a largest fitness function value is discarded, and remaining rows with smaller fitness function values in a population are selected for subsequent crossover and mutation.

c. rows in the population are paired randomly, and two-phase code values of paired rows are subjected to random cross-over, to recombine the paired rows into new rows.

d. code values of some columns in the population are mutated randomly according to a mutation probability, that is, the code values are mutated from 1 to −1, or from −1 to 1.

e. a row with the largest fitness function value in an initial population is replaced with a row with the smallest fitness function value in a new population, and the iterative process returns to step a to compute the fitness function value.

The end condition is that a number of iterations reaches an upper limit, or the genetic algorithm ends when a difference between optimal fitness of two adjacent generations in successive multiple generations is less than a threshold.

An output matrix of the genetic algorithm is the orthogonal two-phase coded signal set.

Step 3, a pulse time width is determined according to the blind area, and a pulse repetition frequency (PRF) is determined according to a highest radial velocity of a target.

Step 4, a radar period is determined according to a radar farthest detection range, the number m of the transmission pulses in a time corresponding to a farthest detection range is determined according to a pulse repetition interval (PRI) obtained in step 3, and m signals are selected from the orthogonal two-phase coded signal set generated in step 2, to constitute a group of orthogonal two-phase coded pulse signals.

Step 5, echoes of transmitted pulse signals are accumulated, to generate an echo matrix, frequency domain pulse compression is performed, to obtain a processed new matrix, and moving target detection (MTD) is performed on the matrix.

Preferably, the method for solving radar ambiguity and occlusion based on an orthogonal two-phase coded signal further includes that a lowest transmission pulse repetition frequency (PRF) of the radar is determined according to a maximum radial velocity of the target, so as to guarantee that no velocity ambiguity caused, and a transmission pulse repetition frequency (PRF) in a high repetition frequency mode is used.

Preferably, a radar period is determined according to the radar farthest detection range, the number m of the transmission pulses is determined according to the pulse repetition interval (PRI) and a reciprocal of the transmission pulse repetition frequency (PRF), PRI is a time interval between two adjacent transmission pulses, and an expression is as follows:

$$m = \frac{T_{max}}{PRI}$$

The orthogonal two-phase coded pulse signals are obtained in combination with the orthogonal two-phase coded signal set described in step 2.

Preferably, the method for solving radar ambiguity and occlusion based on an orthogonal two-phase coded signal further includes that the radar system is accumulated, and the orthogonal two-phase coded pulse signals $a_1, a_2, \ldots, a_m$ are repeatedly transmitted for a plurality of times in one radar period CPI, where a number of $T_{max}$ included in one radar period CPI is adaptively selected according to the radar system.

Further, pulse compression is performed on an echo and the closest transmitting pulse in a conventional radar signal method, which usually causes range ambiguity due to a same transmitting pulse. The radar system in the present disclosure uses a transceiving switching mode. Specifically, a receiver collects echoes in a $T_{max}$ and down-converts the echoes to a digital baseband signal in advance, and then sets the transmitting pulses in a $T_{max}$ to zeros. A time sequence is reconstructed and includes m zeros with a same width as the transmission pulses and m echoes in a $T_{max}$.

Preferably, the frequency domain pulse compression and MTD of the echo matrix specifically include: the echo matrix R is constructed, where a time length of a first row is $T_{max}$ (that is, a time length taking a time when a signal $a_1$ starts to be transmitted as a start), a time length of a second row is $T_{max}$ (that is, the time length taking the time when the signal $a_2$ starts to be transmitted as the start), and so on for subsequent rows, and a subsequent echo in one CPI is processed based on that a plurality of $T_{max}$ are included in the radar period CPI, to obtain the echo matrix R as follows:

$$R = \begin{bmatrix} R_1 \\ R_2 \\ \vdots \\ R_m \\ \vdots \end{bmatrix} = \begin{bmatrix} 0_{a1}, r_{a1}, 0_{a2}, r_{a2}, \ldots, 0_{am}, r_{am} \\ 0_{a2}, r_{a2}, 0_{a3}, r_{a3}, \ldots, 0_{a1}, r'_{a1} \\ \vdots \\ 0_{am}, r_{am}, 0_{a1}, r'_{a1}, \ldots, 0_{a(m-1)}, r'_{a(m-1)} \\ \vdots \end{bmatrix}$$

Frequency domain pulse compression is performed on an echo $R_1$ of the first row of the echo matrix R and $A_1$, where $A_1$ is set as 0 after the transmitted orthogonal two-phase coded pulse signal $a_1$, such that $A_1$ and $R_1$ are time sequences having an equal length, the frequency domain pulse compression is used in a processing mode as follows, and CONJ is a conjugate operation:

$X_1 = \text{IFFT}(\text{FFT}(R_1) \cdot \text{CONJ}(\text{FFT}(A_1)))$

Frequency domain pulse compression is performed on an echo $R_2$ of the second row of the matrix R and $A_2$, where $A_2$ is set as 0 after the transmitted orthogonal two-phase coded pulse signal $a_2$, such that $A_2$ and $R_2$ are time sequences having an equal length. The same processing is performed on the remaining rows of the matrix R, and processed data is placed into corresponding rows of a new matrix X. Fast Fourier transform (FFT), that is, MTD is performed on each column of the processed new matrix X, where a peak value in the matrix represents a range and velocity of the target.

Figure 2:
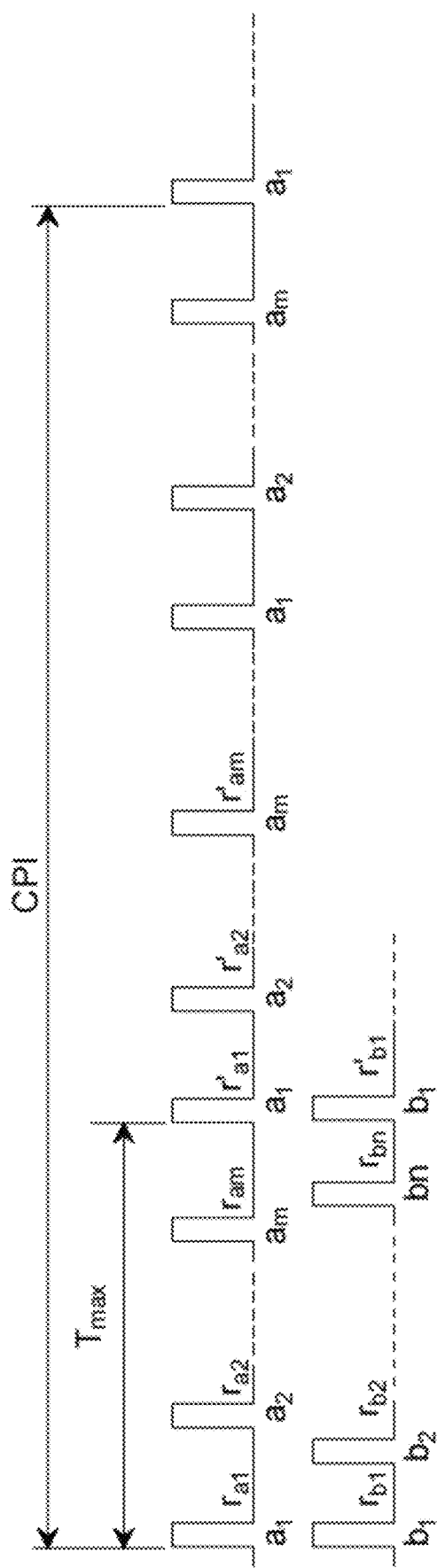
FIG. 2 is a schematic diagram of transmission of orthogonal two-phase coded pulse signals in a radar period according to the present disclosure.

In a traditional pulse Doppler (PD) radar, echoes of different pulses from targets at different ranges may overlap, and a peak of a traditional MTD method is range-ambiguous, which is not enough to distinguish different targets from the overlapping echoes. After the above processing, even if the echoes are the plurality of overlapping target echoes, the peak in an MTD result may reflect that the different targets are located at different ranges, thus solving the range ambiguity of echo overlapping. The radar uses the transceiving switching mode, which will inevitably cause the range occlusion. In order to avoid range occlusion caused by transceiving switching, in some radar periods, another pulse repetition frequency may be used for a transmission signal. The repetition frequency is slightly greater than a minimum pulse repetition frequency. In this case, as shown in FIG. 2, orthogonal two-phase coded pulse signals $b_1, b_2, \ldots, b_n$ are orthogonal in pairs and have desirable auto-correlation and cross-correlation properties, and n is slightly greater than m. The range occlusion may be solved by means of transmission at two different pulse repetition frequencies and then processing of the radar signals.

Embodiment 1

According to the foregoing method, the following example demonstrates the effective feasibility of the present disclosure.

The PD radar has a sampling rate of 100 MHz, a pulse width τ of 0.64 μs, and a pulse repetition interval (PRI) of 64 μs, one radar period ($T_{max}$) includes four PRI, one coherent processing interval (CPI) includes 16 $T_{max}$, a radio frequency f is 3 GHz, and c is a light velocity. In this case, a range blind area is:

$$R_b = \frac{\tau \cdot c}{2} = 96 \text{ m}$$

A maximum unambiguous range is:

$$R_{max} = \frac{T_{max} \cdot c}{2} = 38400 \text{ m}$$

A maximum unambiguous velocity is:

$$v_{max} = \frac{c}{4 \cdot f \cdot PRI} = 390.625 \text{ m/s}$$

Figure 3:
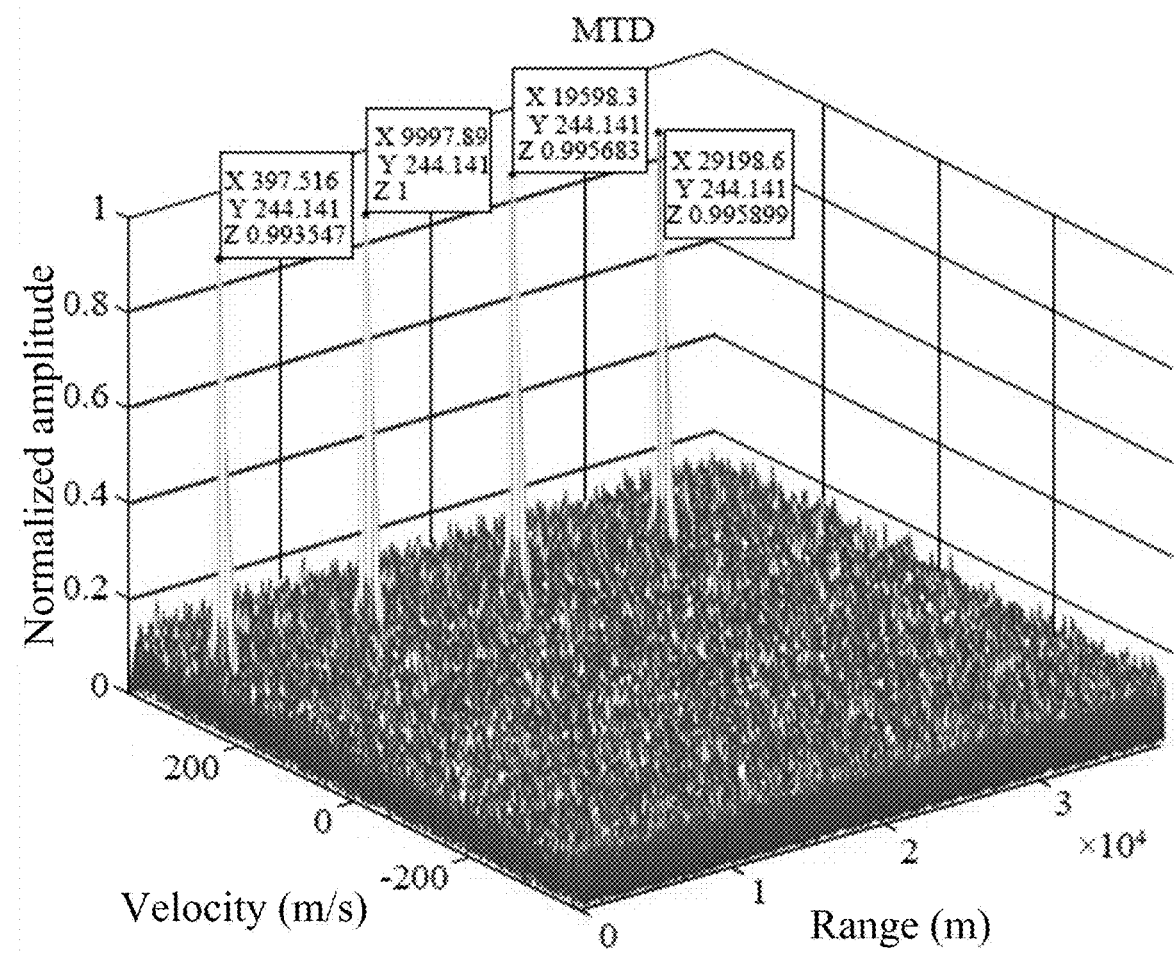
FIG. 3 is a moving target detection (MTD) diagram of the same two-phase coded pulse signals transmitted by a conventional pulse Doppler (PD) radar.

The range of a target is set to be 10 km, the velocity of the target is set to be 240 m/s, and a signal-to-noise ratio is set to be −10 dB. Under the condition that transmission signals are the same signals, an MTD result is as shown in FIG. 3. In this case, echoes of the transmission pulse signal cannot be distinguished, resulting in range ambiguity.

Figure 4:
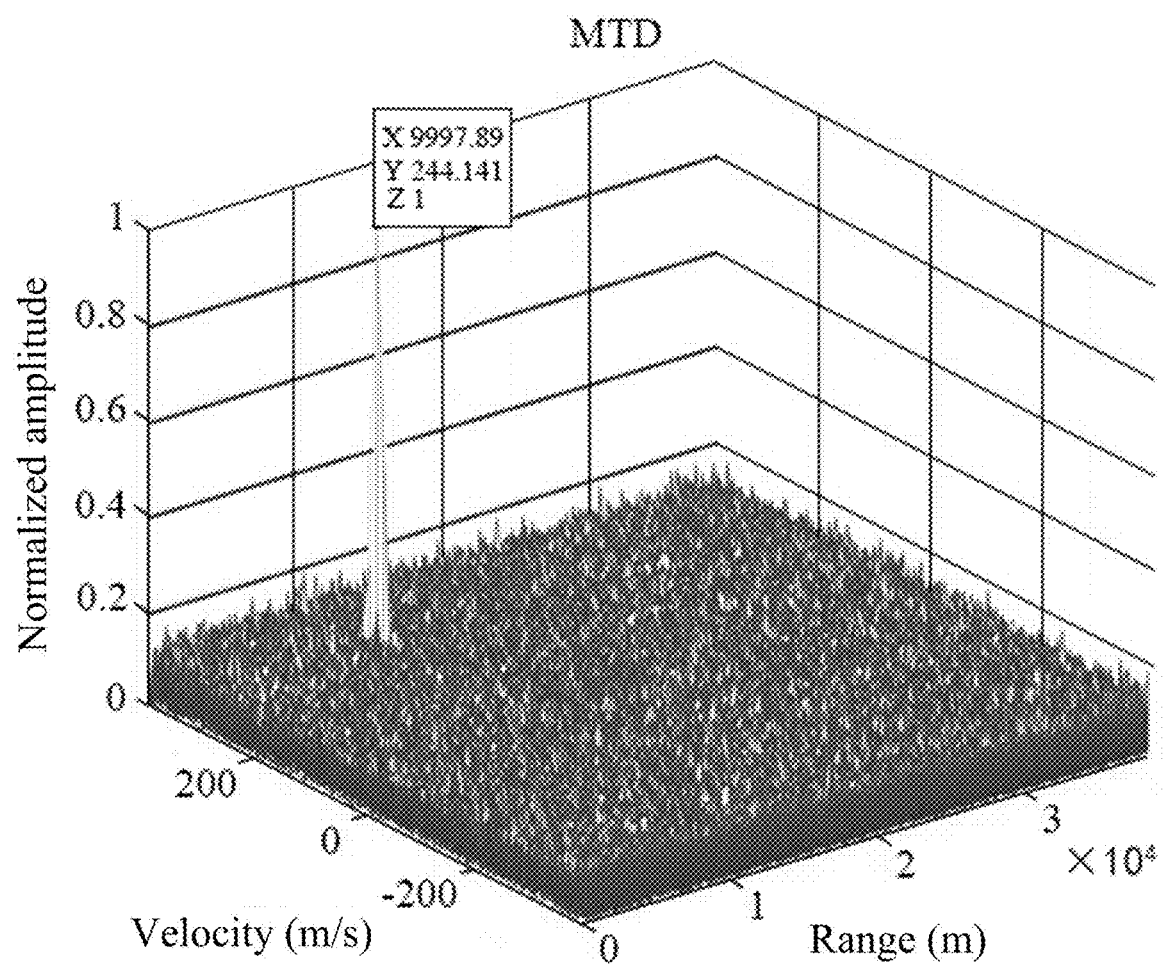
FIG. 4 is a MTD diagram of orthogonal two-phase coded pulse signals transmitted according to the present invention.

Through the method according to the present disclosure, two-phase coded pulse signals orthogonal to each other are transmitted, and an MTD result is shown in FIG. 4. The range and velocity of the target may be accurately measured, and there is only one peak in FIG. 4, that is, there is no range ambiguity.

In order to avoid the range occlusion caused by transceiving switching (a target echo of the current transmission pulse signal delays and then overlaps certain transmission pulse after it, and an echo signal is not received and processed, such that target information cannot be obtained), another pulse repetition frequency is used in this embodiment, and 5 PRIs are included in one radar period $T_{max}$. The range occlusion of the PD radar may be solved by means of transmission at two different pulse repetition frequencies and then processing of the radar signals.

The objectives, technical solutions and beneficial effects of the present disclosure are further described in detail in the above specific implementation modes. It should be understood that the above descriptions are merely specific implementations of the present disclosure, but are not intended to limit the protection scope of the present disclosure. Any modification, equivalent replacement, improvement, or the like made within the spirit and principle of the present disclosure should fall within the protection scope of the present disclosure.

What is claimed is:

1. A method for solving radar ambiguity and occlusion based on an orthogonal two-phase coded signal, comprising:

step 1, determining a maximum code length of two-phase coded signals corresponding to time widths of transmission pulses according to a range blind area and a range resolution of a radar system, and selecting a closest $2^N$ which is less than the maximum code length as a chip length of a single pulse, wherein N is an integer;

step 2, generating and optimizing an orthogonal two-phase coded signal set by means of a walsh matrix and a genetic algorithm, and alternatively obtaining an orthogonal two-phase coded signal set through an exhaustive method, depending on a code length;

step 3, determining a pulse time width according to the blind area, and determining a pulse repetition frequency (PRF) according to a highest radial velocity of a target;

step 4, determining a radar period according to a radar farthest detection range, determining a number m of the transmission pulses in a time corresponding to a farthest detection range according to a pulse repetition interval (PRI) obtained in step 3, and selecting m signals from the orthogonal two-phase coded signal set generated in step 2, to constitute a group of orthogonal two-phase coded pulse signals;

step 5, and accumulating echoes of transmitted pulse signals, to generate an echo matrix, performing frequency domain pulse compression, to obtain a processed new matrix, and performing moving target detection (MTD) on the matrix.

2. The method for solving radar ambiguity and occlusion based on an orthogonal two-phase coded signal according to claim 1, wherein in step 2, in response to a longer chip, the walsh matrix and the genetic algorithm are used for generation and optimization, and with a criterion of minimizing an auto-correlation sidelobe and minimizing a cross-correlation peak, the orthogonal two-phase coded signal set is obtained; and in response to a shorter chip, a better auto-correlation sidelobe and a better cross-correlation peak are selected to form the orthogonal two-phase coded signal set through the exhaustive method.

3. The method for solving radar ambiguity and occlusion based on an orthogonal two-phase coded signal according to claim 2, wherein in step 2, the orthogonal two-phase coded signal set is generated based on the walsh matrix and by means of the genetic algorithm specifically according to the following steps:

constructing a fitness function value of the genetic algorithm as follows:

$$E = \omega_1 \sum_{l=1}^{M} \max_{k \neq 0}|A(\phi_l, k)| + \omega_2 \sum_{p=1}^{M-1} \sum_{q=p+1}^{M} \max_{k}|C(\phi_p, \phi_q, k)|$$

Wherein $A(\phi_l,k)$ is an auto-correlation function, with an expression as follows:

$$A(\phi_l, k) = \begin{cases} \dfrac{1}{N}\sum_{n=1}^{N-k} \exp(j(\phi_l(n) - \phi_l(n+k))), & 0 \leq k < N \\ \dfrac{1}{N}\sum_{n=-k+1}^{N} \exp(j(\phi_l(n) - \phi_l(n+k))), & -N < k < 0 \end{cases}$$

$(\phi_l(n) = 0, \pi)$ $C(\phi_p,\phi_q,k)$ is a cross-correlation function, with an expression as follows:

$$C(\phi_p, \phi_q, k) = \begin{cases} \dfrac{1}{N}\sum_{n=1}^{N-k} \exp(j(\phi_q(n) - \phi_p(n+k))), & 0 \leq k < N \\ \dfrac{1}{N}\sum_{n=-k+1}^{N} \exp(j(\phi_q(n) - \phi_p(n+k))), & -N < k < 0 \end{cases}$$

$(p \neq q; \phi_p(n) = 0, \pi; \phi_q(n) = 0, \pi)$ in a fitness function, $\omega_1$ and $\omega_2$ are weighted coefficients of the fitness function and satisfy $\omega_1+\omega_2=1$;

generating the walsh matrix having a size of N×N, performing random column exchange, and selecting M waveforms with a criterion of minimizing the fitness function value (that is, minimizing the auto-correlation sidelobe and the cross-correlation peak), wherein M is a number of required orthogonal signals, and an optimized M×N matrix serves as an input matrix of the genetic algorithm;

wherein an iterative process of the genetic algorithm comprises:

a. computing the fitness function value of the matrix, determining whether the fitness function value satisfies an end condition, in response to determining that the fitness function value satisfies the end condition, ending iteration, and otherwise, performing next selection, crossover and mutation, and computing the fitness function value until the end condition is satisfied;

b. discarding a row with a largest fitness function value, and selecting remaining rows with smaller fitness function values in a population for subsequent crossover and mutation;

c. pairing rows in the population randomly, and performing random cross-over on two-phase code values of paired rows, to recombine the paired rows into new rows;

d. mutating code values of some columns in the population randomly according to a mutation probability, that is, mutating the code values from 1 to −1, or from −1 to 1;

e. and replacing a row with the largest fitness function value in an initial population with a row with the smallest fitness function value in a new population, and returning to step a to compute the fitness function value;

wherein the end condition is that a number of iterations reaches an upper limit, or the genetic algorithm ends when a difference between optimal fitness of two adjacent generations in successive multiple generations is less than a threshold;

and an output matrix of the genetic algorithm is the orthogonal two-phase coded signal set.

4. The method for solving radar ambiguity and occlusion based on an orthogonal two-phase coded signal according to claim 1, wherein a lowest transmission pulse repetition frequency (PRF) of a radar is determined, and a transmission pulse repetition frequency (PRF) in a high repetition frequency mode is used.

5. The method for solving radar ambiguity and occlusion based on an orthogonal two-phase coded signal according to claim 4, wherein a radar period coherent processing interval (CPI) is determined according to the radar farthest detection range, the number m of the transmission pulses is determined according to the pulse repetition interval (PRI) and a reciprocal of the transmission pulse repetition frequency (PRF), PRI is a time interval between two adjacent transmission pulses, and an expression is as follows:

$$m = \frac{T_{max}}{PRI}$$

the orthogonal two-phase coded pulse signals are obtained in combination with the orthogonal two-phase coded signal set described in step 2.

6. The method for solving radar ambiguity and occlusion based on an orthogonal two-phase coded signal according to claim 5, further comprising accumulating the radar system, and repeatedly transmitting the orthogonal two-phase coded pulse signals $a_1, a_2, \ldots, a_m$ for a plurality of times in one radar period CPI, wherein a number of $T_{max}$ comprised in one radar period CPI is adaptively selected according to the radar system.

7. The method for solving radar ambiguity and occlusion based on an orthogonal two-phase coded signal according to claim 6, wherein the radar system uses a transceiving switching mode, a receiver collects echoes in the $T_{max}$ and down-converts the echoes to a digital baseband signal for pre-processing, then set the transmitting pulses in a $T_{max}$ to zeros, and a time sequence is reconstructed, wherein the reconstructed time sequence comprises m zeros with the same width as the transmission pulses and m echoes in a $T_{max}$.

8. The method for solving radar ambiguity and occlusion based on an orthogonal two-phase coded signal according to claim 7, wherein the frequency domain pulse compression and MTD of the echo matrix specifically comprise:

constructing the echo matrix R, wherein a time length of a first row is $T_{max}$ (that is, a time length taking a time when a signal $a_1$ starts to be transmitted as a start), and a time length of a second row is $T_{max}$ (that is, the time length taking the time when the signal $a_1$ starts to be transmitted as the start), and processing a subsequent echo in one CPI based on that a plurality of $T_{max}$ are comprised in the radar period CPI, to obtain the echo matrix R as follows:

$$R = \begin{bmatrix} R_1 \\ R_2 \\ \vdots \\ R_m \\ \vdots \end{bmatrix} = \begin{bmatrix} 0_{a1}, r_{a1}, 0_{a2}, r_{a2}, \ldots, 0_{am}, r_{am} \\ 0_{a2}, r_{a2}, 0_{a3}, r_{a3}, \ldots, 0_{a1}, r'_{a1} \\ \vdots \\ 0_{am}, r_{am}, 0_{a1}, r'_{a1}, \ldots, 0_{a(m-1)}, r'_{a(m-1)} \\ \vdots \end{bmatrix}$$

performing frequency domain pulse compression on an echo $R_1$ of the first row of the echo matrix R and $A_1$, wherein $A_2$ is set as 0 after the transmitted orthogonal two-phase coded pulse signal $a_1$, such that $A_1$ and $R_1$ are time sequences having an equal length, the frequency domain pulse compression is used in a processing mode as follows, and CONJ is a conjugate operation:

$X_1 = \text{IFFT}(\text{FFT}(R_1) \cdot \text{CONJ}(\text{FFT}(A_1)))$ performing frequency domain pulse compression on an echo $R_2$ of the second row of the matrix R and $A_2$, wherein $A_2$ is set as 0 after the transmitted orthogonal two-phase coded pulse signal $a_2$, such that $A_2$ and $R_2$ are time sequences having an equal length;

performing the same processing on the remaining rows of the matrix R, and placing processed data into corresponding rows of a new matrix X;

and performing fast Fourier transform (FFT), that is, MTD on each column of the processed new matrix X, wherein a peak value in the matrix represents a range and velocity of the target.

* * * * *